UNITED STATES PATENT OFFICE.

WILLIAM H. WILLIAMS, OF SHARPSBURG, PENNSYLVANIA.

METHOD OF TREATING WATER.

1,139,618. Specification of Letters Patent. Patented May 18, 1915.

No Drawing. Application filed May 4, 1914. Serial No. 836,346.

*To all whom it may concern:*

Be it known that I, WILLIAM H. WILLIAMS, a resident of Sharpsburg, in the county of Allegheny and State of Pennsylvania, have invented a new and useful Improvement in Methods of Treating Water, of which the following is a specification.

This invention relates to a method of utilizing ordinary blast furnace or other slag with the object of converting what is usually substantially a waste product or even a source of expense into a valuable by-product.

Some attempts have been made to utilize slag for road material, or for other like uses, but it commands only a low price because only the physical or rock properties of the slag can be thus utilized, and the cost of handling it is high. In some instances it is necessary to crush or break up the slag, which increases the cost. For road purposes crushed or finely divided slag sells for two or three dollars a carload, and since the freight may be several times that amount it is usually cheaper to use natural or other road material that may be obtained from a location near at hand.

According to the present invention the chemical or mineral properties and constituents of furnace slag are utilized in the treatment of water for industrial and other purposes, and in a manner to leave the physical structure of the slag practically unchanged so that it is as valuable for road-making purposes, etc., as though its chemical or mineral constituents had not been utilized.

The invention can be practised in many different ways, and the particular method of utilizing slag hereinafter described is merely illustrative, it being understood that the invention is not limited to the particular method described.

In practising the method the chemical or mineral constituents of the slag are dissolved from the slag by leaching it in any suitable way. Inasmuch as the solution can be most readily produced when the slag is in a granulated condition, it is preferred to granulate the slag simultaneously with the leaching thereof, and consequently it is preferred to run the slag while in a hot or molten condition into a pit or tank containing water of any suitable temperature. This breaks up the slag into small pieces or grains, the size of which depends to some extent upon the drop between the slag outlet and the water level, the water and slag temperatures, and other factors. The water used may be ordinary natural water, in which case the line content of the slag added thereto forms calcium hydrate and corrects any acidity in the water and also overcomes its temporary hardness. The lime dissolved from the slag by the water leaves the slag in substantially the same condition as before, that is, as a mass of small fragments or pieces, and which is good road material or can be used in any other manner to take advantage of its physical characteristics. The water may be drawn off from the tank or pit in batches and then treated to overcome its permanent hardness in the ordinary manner, although in many cases no special treatment for permanent hardness is necessary. It may also be treated to overcome the permanent hardness in the same pit or tank to which the slag is first admitted. The treated water produced in either manner can be used for industrial purposes, that is either directly as boiler feed water or as cooling water in the water jackets of blast furnaces, ovens or other devices, or it may be used to treat other water to correct its hardness, acidity and other corrosive tendencies, as the water is usually strongly impregnated with the chemical and mineral constituents of the slag and can be diluted with natural water, and still be neutral and fit for use in steam boilers etc. Preferably, the water is treated in a large reservoir from which only a small proportion of the total solution is drawn at one time, hot slag being dumped in from one or more furnaces at intervals. This produces a uniform solution of average strength, as variations in the composition of the slag from any given furnace or from a number of furnaces do not have such a material effect upon the composition of the solution, and the quantity and character of chemical or mineral constituents contained therein do not vary appreciably from day to day.

Some natural waters used for industrial purposes have been found to require as much as 17 pounds or 119,000 grains of lime (CaO), for about 20,000 gallons of water to render them neutral or non-injurious and suitable for industrial purposes. Water in which ordinary blast furnace slag of the type above referred to has been leached for a short time has been found to contain about 10 grains of lime to the gallon. Thus 20,000 gallons of such water contains about 200,000 grains of lime and may therefore be utilized for effectively treating approximately twice its own volume of natural water of the kind specified above. This saves the cost of about 50 pounds of lime, which amounts to a considerable item saved in the course of a year. Slag-leached or treated water of the character described is well adapted without further treatment for use in the water jackets of blast furnaces, ovens or similar devices, since it is of an alkaline nature and produces no corrosive effect upon the metal of the furnace and therefore prevents pitting of the same. Being a form of lime hydrate it is an advantage rather than a detriment, as it has a tendency to form a slight coating on the inner surface of the jacket walls which protects the same from the deleterious effects of waters contaminated with acids or other substances of a corrosive nature. If the coating becomes unnecessarily thick, the use of a slightly acid contaminated water for a few hours will dissolve away this coating. Somewhat the same effects described above may be obtained by merely grinding or reducing the slag to a powdered or granular condition and then introducing it directly into water treating plants commonly used by large consumers of water for steam purposes, in which plants the water takes up the chemical or mineral constituents of the slag in the same way that it now takes up the lime and other expensive reagents commonly used in such plants.

The crushed, powdered or granular slag may also be used in the filtering and clarifying beds through which the water supply of large cities is passed. In these beds sand is usually employed for clarifying the water and filtering the foreign matter therefrom, and in nearly all such plants lime and also alum are commonly used, both of which substances are effective water clarifiers. The lime also corrects acidity of the water and helps to reduce its temporary hardness.

The method described converts what usually is considered a waste product into a source of revenue. The slag-treated water takes up a heavy burden of chemical or mineral constituents which are sufficiently valuable to warrant transportation for great distances. The chemical or mineral constituents of slag are utilized to great advantage in the treatment of water for various industrial purposes and in all the cases described the slag is left with practically the same physical structure that it had before and is as good or better for ordinary uses which take advantage of its physical characteristics, such as for filling or for road making material, as it was before.

What I claim is:

1. The method of utilizing slag, consisting of bringing the same in a molten condition into contact with water and thereby reducing the slag to a finely divided condition and producing a solution impregnated with certain of the mineral or chemical constituents of the slag, and utilizing said solution for industrial purposes.

2. The method of utilizing slag, consisting of bringing the slag while hot into contact with water in a pit or tank and thereby reducing the slag to a finely divided condition and producing a solution containing certain of the mineral or chemical constituents of the slag, drawing off portions of said solution from time to time and utilizing the same for industrial purposes, and replenishing the supply of liquid in the pit or tank with natural water.

In testimony whereof, I have hereunto set my hand.

WILLIAM H. WILLIAMS.

Witnesses:
GLENN H. LERESCHE,
WILLIAM B. WHARTON.